Dec. 30, 1941.  P. R. GJERTSEN  2,268,479
ABRADING TOOL
Filed March 29, 1939  2 Sheets-Sheet 1
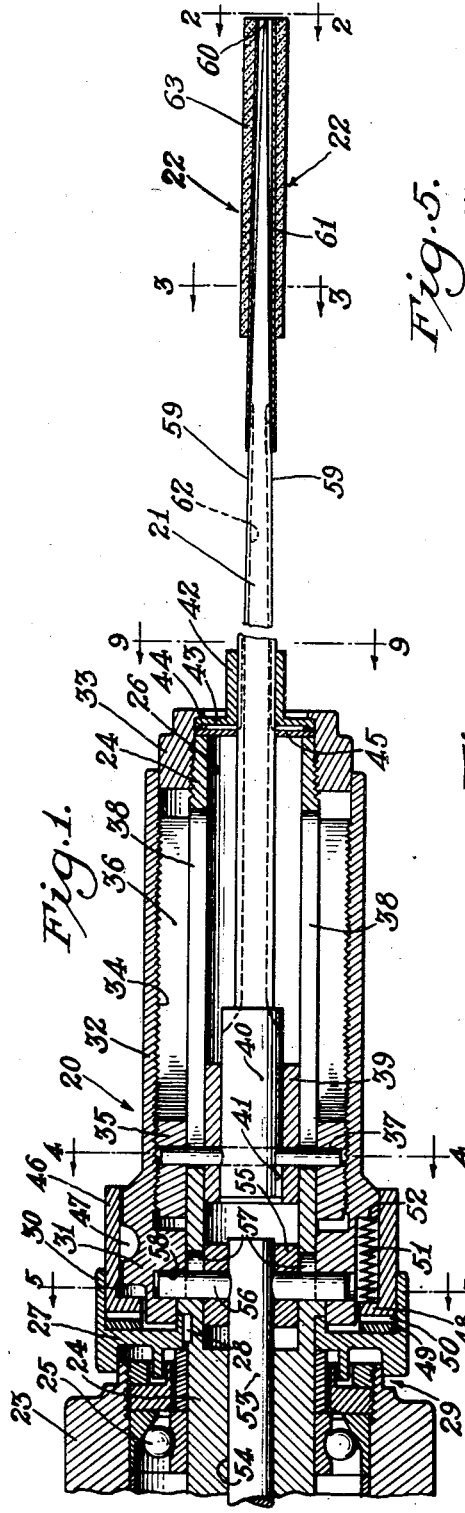
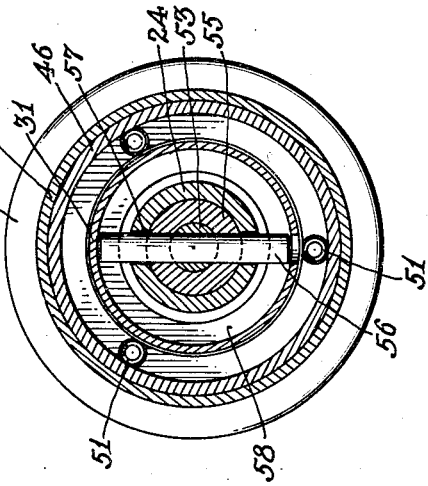
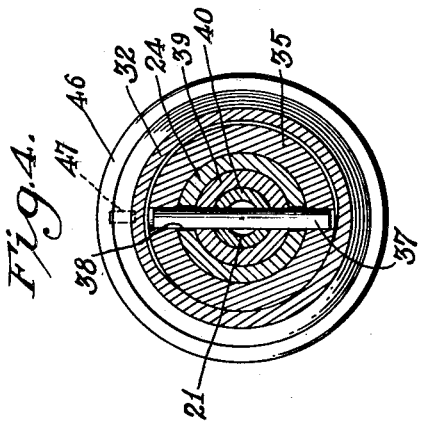
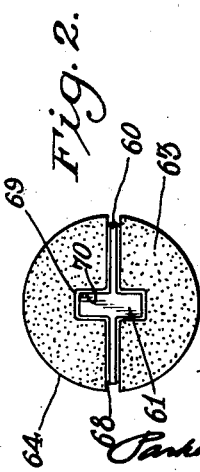
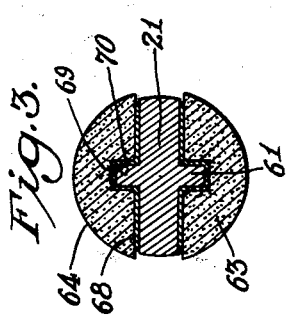
Inventor
Paul R. Gjertsen
BY
Parker, Carter, Piper & Hubbard
Attorneys.

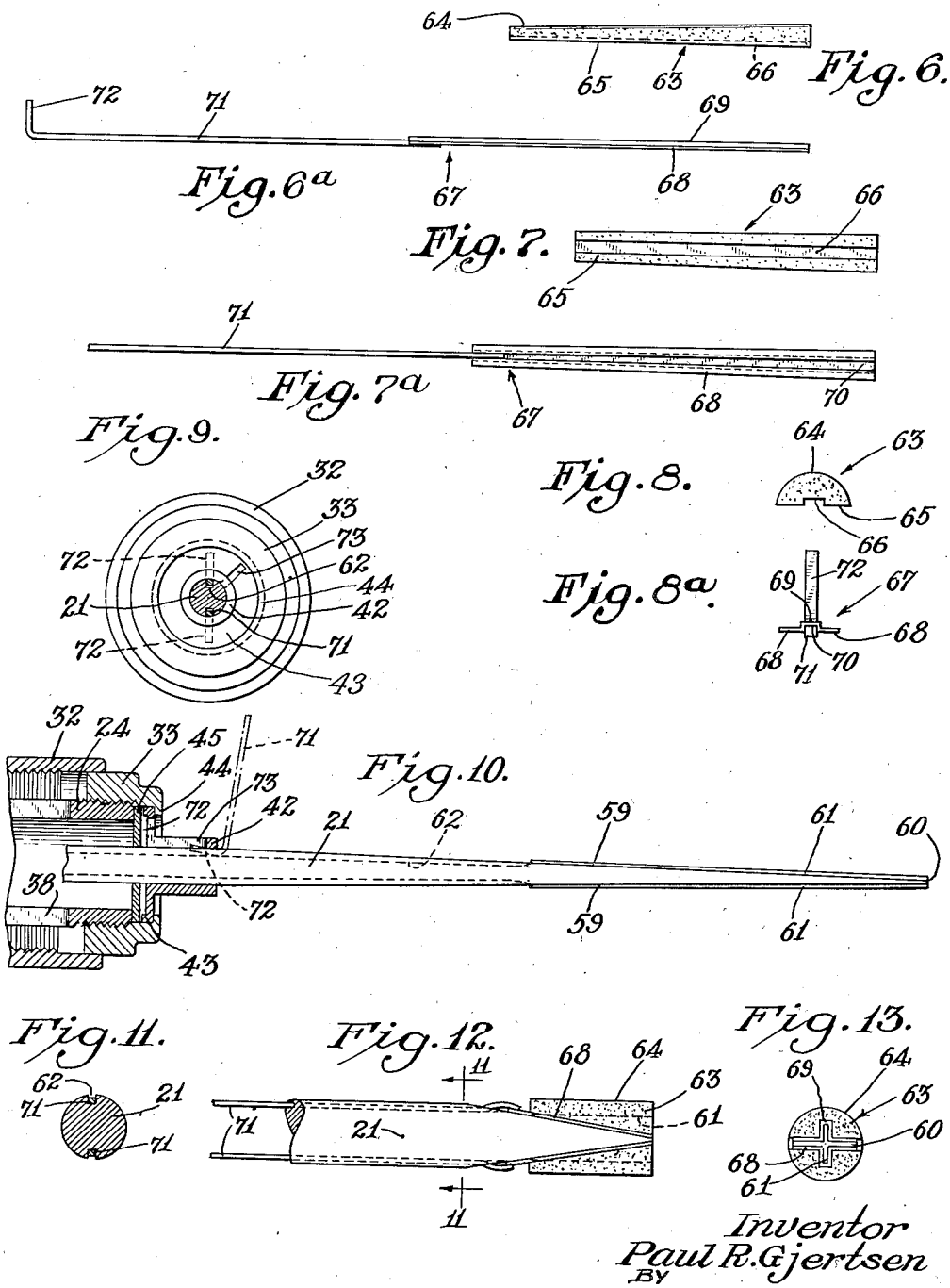

Patented Dec. 30, 1941

2,268,479

UNITED STATES PATENT OFFICE 2,268,479

ABRADING TOOL

Paul R. Gjertsen, Detroit, Mich., assignor to Ex-Cell-O Corporation, Detroit, Mich., a corporation of Michigan Application March 29, 1939, Serial No. 264,706

12 Claims. (Cl. 51—184.3)

The invention relates to abrading or lapping tools or the like for removing material by an abrading action from the surfaces of cylindrical bores and this application is a continuation in part of my copending application Serial Number 188,593, filed February 4, 1938.

An object of the invention is to provide an improved tool of this character in which the abrading elements are associated with a supporting member or mandrel in a novel manner for accurate and rapid radial adjustment.

More specifically stated, an object of the invention is to provide a new and improved abrading tool which embodies a mandrel having tapering or wedge surfaces for effecting radial adjustment of abrading devices arranged to coact with said surfaces, and in which the abrading devices are arranged to present in any position of adjustment active abrading surfaces which are substantially segments of a cylinder and have flat supporting faces that are related to the axis of the cylindrical segment on an acute angle complemental to the angle of the tapering mandrel surfaces, the abrading devices being connected with the mandrel by snugly interfitting parts which are effective when the devices abut the tapering surfaces and by control members which extend in one direction from the abrading devices and provide for positive connection between the devices and the mandrel.

Another object of the invention is to provide an abrading tool comprising an assembly of several coacting and interfitting members, each of which individually have novel features whereby assembly, replacement, adjustment and other operations usually encountered may be simply and efficiently performed. With specific reference to these features, as shown and described in the exemplary structure herein disclosed, the novel abrading element includes an elongated body shaped as the secantial segment of a cylinder having a flat supporting surface angular with respect to the axis of the cylindrical surface and longitudinally grooved substantially medially for connection with an improved holder or supporting shoe. The latter member embodies a flat plate, preferably of sheet metal, or the like, dimensioned and arranged to be secured only to the flat surface of the abrading element with the side margins of the abrading element slightly overhanging or extending beyond the corresponding plate margins, the plate having a rib for engagement with the groove in the abrading element and having a groove for guiding engagement with a rib on the mandrel, and a control and adjusting member extending from the narrower end of the plate as the sole means for securing and adjusting the plate relative to the mandrel. The novel mandrel includes an elongated member which has opposed surfaces tapering to a thin diametrically located end edge, the surfaces each having an outstanding longitudinal rib for engagement with the groove in a holder and the mandrel having longitudinal grooves therein to receive the control members.

Other objects and advantages will become apparent from the following description and in the accompanying drawings, in which:

Figure 1 is an axial sectional view through an abrading tool embodying the features of the invention in operative association with driving and adjusting means.

Figs. 2 and 3 are end and transverse sectional views of the tool respectively as indicated by the lines 2—2 and 3—3 of Fig. 1.

Figs. 4 and 5 are transverse sectional views of the driving and adjusting means taken respectively along the lines 4—4 and 5—5 of Fig. 1.

Figs. 6 and 6ª are side views respectively of the abrasive element and the holder therefor.

Figs. 7 and 7ª are views of the abrasive element and holder respectively looking toward the flat, grooved face of the abrasive element and the grooved side of the holder.

Figs. 8 and 8ª are views of the abrasive element and holder respectively looking toward the free ends thereof.

Fig. 9 is a transverse sectional view of the tool taken on the line 9—9 of Fig. 1.

Fig. 10 shows a side of the mandrel in elevation and the front end of the driving and adjusting means in axial section.

Fig. 11 is a transverse sectional view of a slightly different form of abrading tool taken along the line 11—11 of Fig. 12.

Fig. 12 is a side view of the free end of the form of tool shown in Fig. 11.

Fig. 13 is an end view of the tool shown in Fig. 12.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the embodiment of the invention that has been selected for illustrative purposes, the numeral 20 designates generally a tool support, in the nature of a tool chuck, which drivingly receives one end of a spindle or mandrel 21 having abrading devices 22 operatively associated with the outer or free end thereof. While tool supports other than the illustrated structure would be operative in conjunction with the present tool, the construction shown in Figs. 1, 4, 5 and 9 is especially well adapted therefor.

Referring particularly to Fig. 1, a bearing frame member, fragmentarily indicated at 23, has a driven spindle 24 journaled therein through a bearing 25. The spindle extends a substantial distance beyond the end of the frame and the extension has an axial bore 26. Encircling the spindle adjacent to the end face of the frame is a radial plate 27 which is keyed, as at 28, to the spindle and is dust-sealed with respect to the frame by interfitting end flanges generally indicated at 29. The radial plate has a forwardly extending concentric flange 30 at its periphery that encircles the enlarged end 31 of an elongated sleeve 32. The enlarged end of the sleeve is dimensioned to fit rotatably on the spindle and the sleeve beyond said end extends in radially spaced relation forwardly along the spindle nearly to the free end thereof. At its outer or free end, the sleeve rotatably encircles an adjacent portion of a clamping member or annulus 33 screw threaded on the end of the spindle. Internally the sleeve is provided with screw threads 34 for engagement by external screw threads on a ring nut 35 which is located in the space 36 between the spindle and sleeve and is slidably supported by the spindle. A pin 37, or the like, mounted by its ends in the nut, extends diametrically of the spindle through elongated, longitudinal slots 38 oppositely formed in the spindle and extending nearly to the free end thereof. The pin also extends through a collar 39 in the spindle bore 26 which is adapted to receive and support an enlarged head 40 on the inner end of the shank of the mandrel 21. A detachable connection, such as a bayonet slot 41 in the head 40, drivingly joins the mandrel to the pin 37. Bearing means for the mandrel at the front end of the spindle preferably comprises a bearing member 42 having a radial flange 43 arranged to be marginally bound between an annular lip 44 on the clamping member 33 and the end face of the spindle. A washer 45 is interposed between the spindle end and the flange 43 and as will be presently described the assembly of the bearing means and the washer in fixed relation to the spindle is employed to secure the abrading elements in position with respect to the mandrel and for longitudinal adjustment relative thereto.

The sleeve 32 serves as a position adjusting means for the abrading devices since rotation of the sleeve relative to the spindle will advance or retract the nut 35 axially, the nut being held against rotation with the sleeve by the engagement of the pin 37 in the spindle slots 38. Movement of the nut effects a corresponding axial movement of the mandrel.

To prevent self-adjustment of the nut 35 and associated parts by the driving movement of the spindle, frictional locking means between the sleeve 32 and the spindle or a part rotating therewith is provided. In this instance, a collar 46 surrounds the enlarged end 31 of the sleeve 32 and is keyed thereto as at 47 for relative movement only in an axial direction. The inner end of the collar is enclosed by the flange 30 on the radial plate 27 and the collar has a radial end flange 48 disposed in spaced opposition to the plate. The end face of the flange 48 is notched, serrated or otherwise appropriately fashioned for frictional engagement with similar configurations on the face of an annular member 49 fixed to the radial plate. The frictional engaging means is designated at 50 and is normally maintained by a series of springs 51, or the like, which are seated in bores 52 in the enlarged sleeve end 31 to bear against the end flange 48.

The tool support includes means which may be actuated manually or automatically for effecting relative movement of the mandrel and abrading devices to produce an expanding radial adjustment of the abrading devices to size or a retraction thereof to permit insertion of the tool into or removal thereof from a bore in a work piece. To this end, a rod 53 is slidably and rotatably seated in an axial bore 54 formed in the spindle as a restricted continuation of the end bore 26. The end of the rod extends into the end of the bore 26 and is there supported by a sliding block 55. A radial pin 56 extends through oppositely located longitudinal slots 57 of limited length in the spindle and the pin ends extend into an annular groove 58 in the enlarged sleeve end 31. This connection permits the sleeve 32 and the associated parts connecting the mandrel therewith to be moved by the rod 53 axially relative to the spindle to the extent determined by the slots 57. The sleeve 32 may, however, be independently rotated, after release of the frictional interengagement 50 to adjust the nut and fix initially the position of minimum operating diameter of the abrading devices, the maximum diameter for any initial adjustment being determined by the limit of movement of the rod 53. These adjustments may be made, if desired, while the tool support is in operation.

The abrading tool, which embodies the features of the present invention, comprises the mandrel 21 and the abrading devices 22 (two of which are herein shown) associated with the mandrel and with the tool support in a simple and novel manner for quick assembly, accurate adjustment, and efficient operation.

The mandrel in the preferred form shown in Figs. 1 and 10 is an elongated circular rod having the head 40 rigidly secured to its inner end. The outer end has oppositely disposed tapering wedge surfaces 59 which slope gently and uniformly to a relatively thin end 60 located on a diameter of the mandrel. A narrow upstanding rib 61 (Figs. 1, 2, 3 and 10) extends longitudinally and substantially medially from the end edge of each tapering surface 59. The ribs on both surfaces are alike, are of uniform width and preferably diminish slightly in height inwardly from the free end. The ribs extend a substantial distance along the tapered surfaces and beyond each rib and in longitudinal alinement therewith, the shank of the mandrel is groved as at 62 (Figs. 1, 9 and 10) approximately to the head 40. These grooves receive the assembly and adjustment control members of the abrading devices.

Each abrading device includes an abrading element 63 having an active face 64 of sectional cylindrical contour and the device has a flat face for abutment with a tapering surface on the mandrel and angularly related to the active face on an angle which is the complement of the angle of slope of the tapering surface. Each abrading element 63 is an elongated body somewhat shorter than the ribs 61 on the mandrel and shaped as a secantial segment of a cylinder. The active face 64 of the body is formed on a radius slightly greater than that of the mandrel. Opposite the active face is a flat face 65 (Figs. 6, 7 and 8) defined preferably by the plane of a chord of the cylinder which is angularly related to the axis of the cylindrical surface at an acute angle complemental to the angle of a tapering mandrel surface. The resulting body has a cylindrical section forming its active face and the body tapers gradually and uniformly from end to end both in width and thickness. The width of the flat face at the larger end is preferably only slightly less than the diameter of the cylinder. The flat face is traversed longitudinally and substantially medially by a groove 66 which is substantially narrower than the face and is of uniform width and of slightly diminishing depth from the larger to the smaller end.

The abrading element may be made of any suitable material, for example a finely divided bonded abrasive, and in such an element the groove is preferably of square or rectangular cross section to avoid undue weakening of the element.

The abrading element is preferably mounted on a supporting member 67 constituting a holder or shoe to complete the abrading device. As illustrated in Figs. 2, 3, 6, 7 and 8, a preferred form of holder comprises a flat plate 68 somewhat longer than the abrading element and shaped to taper uniformly from one end to the other in accordance with the taper of the flat face of the abrading element. The varying width dimensions of the plate are slightly less than those of corresponding parts of the abrading element face 65 so that when the element and plate are appropriately secured together in face to face abutment with the wider dimensions substantially coinciding, the side margins of the abrading element will extend slightly beyond or overhang the margins of the plate (see Fig. 2). Thus, only the active face of the abrading element can ever contact the surface of the work.

The plate may well be fashioned of thin gauge sheet metal and has a longitudinal central or medial section pressed out of the plane of the plate to provide a rib 69 upstanding from one side and a groove 70 in the other side of the plate. The rib and groove are of uniform width throughout their respective lengths, and both diminish or taper gradually in height or depth from the wide to the narrow ends of the plate. The plate rib 69 and the abrading element groove 66 are dimensioned to interfit snugly and provide an interlock between these parts. The plate groove 70 is dimensioned to fit snugly and slidably over the mandrel rib 61 and the relationship prevents other than endwise movement of the abrading device on the mandrel. The plane of the holder, when assembled with the abrading element, has the same angular relationship to the active cylindrical face and to a tapering mandrel surface as does the flat face 65 of the abrading element. As may be seen in Figs. 2 and 3, the wide dimension of the tapering mandrel surfaces is narrower than the width of the flat faces on the abrading elements.

The holder includes a control and adjusting element arranged to extend endwise from the narrower end of the plate substantially as a continuation of the central pressed section thereof. In this instance, a thin elongated rod or wire 71 has one end seated in and suitably secured to the end portion of the plate groove 70 at the narrower end of the plate. The wire is dimensioned to seat relatively snugly in a mandrel groove 62. The free end of the wire is bent to provide a right angular end portion 72 which forms the means for securing the abrading device to the tool support and mandrel.

The assembly of the abrading device with the tool support is best seen in Figs. 1, 9 and 10. The mandrel bearing member 42 at the front end of the spindle has a longitudinal slot 73 (Fig. 10) therein extending from a point near to the outer end thereof through the length of the member and through the radial flange 43. This slot may by rotation of the bearing member be caused to register with a mandrel groove 62 to permit the angular end portion 72 on the wire to be passed through the mandrel groove beneath the unsevered end portion of the bearing member, as indicated in dotted outline in Fig. 10, and thence into the slot 73. Lengthwise movement of the abrading device rearwardly moves the wire end portion 72 through and past the radial flange 43 and rotation of the bearing member disposes the end portion 72 between the flange 43 and the washer 45. The second abrading device may be assembled in the same manner. Hence, when the parts are secured to the supporting tool between the spindle end and the clamping member 33, the abrading devices are firmly fixed in position and are supported by the mandrel in a manner that permits of relative adjusting movement between the mandrel and abrading devices.

In Figs. 11, 12 and 13, a slightly different form of abrading device is shown in which the abrading elements and holders are shorter than those previously described and the slope of the tapering mandrel surfaces as well as the angularly complemental surfaces on the abrading devices are considerably steeper. Where a comparatively large quantity of material is to be removed from a work piece, this form of device is preferred because of its capacity for greater and more rapid radial adjustment. Since the parts are, except for form, substantially the same in both devices, the same reference numerals indicate similar parts.

In operation and presuming the abrading devices are assembled on the tool support and mandrel, the minimum diameter of the cylindrical active faces of the abrading elements is determined by adjustment of the nut 35 for insertion of the tool into the bore and to permit the tool to be expanded to produce the desired maximum bore diameter. The abrading devices are maintained in precise longitudinal relation to the tapering mandrel surfaces so that the operator need only make certain of a proper engagement between the mandrel ribs and the opposed grooves as he effects insertion of the tool into the bore of the work piece. The abrading devices may be adjusted to or slightly beyond the end edge 60 of the mandrel to perform a lapping, finishing or other working operation substantially at the extreme inner end of a blind bore. The circumferentially wide and substantially continuous cutting surface afforded by the semicylindrical shapes of the two abrading elements insures that the tool will cut to accurately controlled dimensions, even though the bore surface is interrupted by relatively wide keyways or the like. The abrading tool is well adapted for lapping operations and the novel arrangements and relationships of the various parts, i. e., the mandrel, the shoes and the abrading elements, provide a tool which is of simple construction yet is accurate and efficient in operation and, due to the width of the several abutting faces, possesses ample rigidity in operative assembly to prevent tilting of the abrading element.

I claim as my invention:

1. An abrading tool comprising, in combination, an elongated rod having an end portion tapering gradually and uniformly from opposite sides to a thin end edge, each of the tapering sides having a longitudinal and medial upstanding rib of uniform width, said rod having a groove therein extending longitudinally in endwise alinement with each of said ribs, a lapping device for each of said tapering sides, each of said lapping devices being grooved guidingly to engage a rib, elongated means extending endwise from each of said devices and receivable in the associated groove in said rod, and connecting means for securing said devices to said rod only through said elongated members.

2. A tool of the class described, an annular shank having at one end flat tapered surfaces, a tapered guiding rib on each of said surfaces, pressed metal holders conforming to said surfaces and the rib thereon, an abrasive member bonded to each holder, and means for adjustably positioning said holders longitudinally of said surfaces.

3. An abrading device for an abrading tool comprising, in combination, an elongated flat sheet metal plate tapering gradually in width from one end to the other end and having a lengthwise medial portion pressed out of the plane of said plate to provide a rib on one side of the plate and a corresponding groove on the opposite side of the plate, an abrading element having a flat face for abutment with said plate and having a groove to receive the plate rib, the longitudinal edges of said element extending beyond the corresponding margins of said plate, the groove in said plate being dimensioned for guiding engagement by a supporting member, and control means secured to the narrower end of the plate.

4. An abrading device for an abrading tool comprising, in combination, an abrading element having an elongated body shaped as a secantial segment of a cylinder with the plane of the secant chord located at an acute angle to the axis of the cylindrical surface whereby the body has a gently tapering form, a longitudinal medial groove in the flat face of said body, a holder secured to the flat face of said body and having a longitudinal rib interfitting with and secured in said groove, said holder having a longitudinal taper and having a width dimension less than that of the abrading body.

5. An abrading element for an abrading tool comprising a body shaped as a secantial segment of a cylinder, the plane of the secant chord being angular with respect to the axis of curvature of the cylindrical surface to provide a body of tapering width, the plane face of the body being longitudinally traversed by a groove having uniform width and gradually varying depth.

6. A holder for the abrading element of an abrading tool comprising an elongated plate having flat marginal portions in substantially the same plane and an intermediate longitudinally extending portion providing a medial rib on one side and a groove on the other side of said plate, and a control element extending longitudinally from said plate substantially in the plane thereof and having an end portion seated in an end section of said groove and there secured, said central portion being of uniform width and having a height dimension which gradually diminishes from one end of the plate to the other.

7. A supporting member for the abrading element of an abrading tool comprising an elongated sheet metal plate of uniformly tapering width having a longitudinally extending medial section pressed outwardly of the plane of the plate to form an upstanding rib on one side and a groove on the other side of the plate, said rib and groove being substantially rectangular in cross section and being of uniform width and having gradually diminishing height and depth respectively from one end of the body to the other.

8. A holder for the abrading element of an abrading tool comprising an elongated plate of gradually tapering width having a narrow upstanding rib on one side of the plate and a narrow groove on the other side of the plate, said rib and groove extending longitudinally and substantially medially of said plate.

9. A mandrel for an abrading tool comprising an elongated rod having an end portion tapering gradually and uniformly from both sides to a substantially thin end edge, each of the tapering sides having a longitudinal and medial upstanding rib, the body of said rod beyond said ribs having grooves extending in longitudinal alignment with said ribs.

10. A mandrel for a lapping tool comprising an elongated rod having an end portion tapering gradually and uniformly from both sides to a thin end edge, each of the tapering sides having a longitudinal and medial upstanding rib of uniform width, the height of said ribs diminishing uniformly from the end edge of the rod.

11. A holder for the abrading element of an abrading tool comprising an elongated plate of gradually tapering width having a narrow upstanding rib on one side of the plate and a narrow groove on the other side of the plate, said rib and groove extending longitudinally and substantially medially of said plate, said plate laterally of the rib and groove being flat to its side margins for the abutment of each flat face thereof with flat surfaces on coacting parts.

12. A tool of the class described comprising, in combination, a shank having longitudinally extending grooves of uniform depth in its outer periphery and having tapered surfaces at one extreme end thereof, a longitudinally adjustable collar at the opposite end thereof, abrasive elements on said tapered surfaces, and flexible rods in said grooves interconnected between said abrasive elements and said collar and adapted under the control of said collar to move said abrasive elements to the extreme free ends of said tapered surfaces.

PAUL R. GJERTSEN.